United States Patent [19]

Gilbert

[11] Patent Number: 5,436,510
[45] Date of Patent: Jul. 25, 1995

[54] METHOD AND A SYSTEM FOR GLOBALLY MANAGING ELECTRIC POWER IN A NETWORK WITHIN A DWELLING OR THE LIKE

[75] Inventor: Jerome Gilbert, Levallois-Perret, France

[73] Assignee: Euro CP s.a.r.l., L'Hay Les Roses, France

[21] Appl. No.: 44,036

[22] Filed: Apr. 8, 1993

[30] Foreign Application Priority Data

Jul. 3, 1992 [EP] European Pat. Off. ........ 92401921.9

[51] Int. Cl.⁶ .............................................. H02J 3/14
[52] U.S. Cl. ...................................... 307/38; 307/39; 364/492
[58] Field of Search ............... 307/11, 38, 39, 40, 307/41, 141–141.4; 315/314–319, 323; 333/2, 100, 101; 318/98–103; 340/825.04, 825.06, 825.11, 825.12; 364/492, 493

[56] References Cited

U.S. PATENT DOCUMENTS

| 4,510,398 | 4/1985 | Culp et al. | 364/492 |
| 4,694,192 | 9/1987 | Payne et al. | 364/492 |

FOREIGN PATENT DOCUMENTS

| 0208597 | 1/1987 | European Pat. Off. . |
| 0250320 | 12/1987 | European Pat. Off. . |
| 0265342 | 4/1988 | European Pat. Off. . |
| 0372961 | 6/1990 | European Pat. Off. . |
| 0486983 | 5/1992 | European Pat. Off. . |
| 2349989 | 11/1977 | France . |
| 2404326 | 4/1979 | France . |
| 2071438 | 9/1981 | United Kingdom . |

OTHER PUBLICATIONS

"A Residential Energy Management Test Using CEBus", *IEEE 1990 International Conference on Consumer Electronics*, Jun. 6–8, 1990, by J. Kelly et al., pp. 238–239.

*Primary Examiner*—Jeffrey A. Gaffin
*Assistant Examiner*—Peter Ganjoo
*Attorney, Agent, or Firm*—Young & Thompson

[57] ABSTRACT

Method for managing electric power in a network (R) to which are connected, on the one hand, appliances capable of 2-way communication with each other, each appliance consisting of a power subassembly and a control subassembly and, on the other hand, a so-called power manager unit designed to manage load shedding and reconnection functions exclusively affecting the said power subassemblies of each appliance with each disconnectable appliance being disconnected a priori.

Any request for significant electric power made by a disconnected appliance results in a transaction between the said appliance and the power manager during which the said requesting disconnected appliances supplies the said power manager with information of a quantitative and qualitative nature concerning the power requested and on completion of which the said power manager authorizes or does not authorize reconnection of the power subassembly of the said requesting appliance.

Used for the implementation of home networks equipped with dynamic management of electric power.

12 Claims, 4 Drawing Sheets

FIG_5

METHOD AND A SYSTEM FOR GLOBALLY MANAGING ELECTRIC POWER IN A NETWORK WITHIN A DWELLING OR THE LIKE

BACKGROUND OF THE INVENTION

1. Field of the Invention

The present invention relates to a method of managing electric power in a network within a dwelling. It also concerns a system for its implementation.

2. Description of the Related Art

Management of electric power in a network within a dwelling involves limiting the total power drawn from the mains system to a value which is less than the sum of the powers of all the appliances installed in the building without the user being inconvenienced by this limiting.

The term "dwelling" is construed as any self-contained or multi-occupancy premises for private, public or professional use. The term "network" is construed as any home network which uses any communication medium. In the discussion below, it is to be understood that the terms "appliances" and "electrical devices" are to be taken as synonymous.

For purchasers of a home network, the aim is to reduce their expenditure commitment to their electric power distributor. The reduction in costs achieved by power management is directly related to the tariff policy of the electric power distributor. If the cost of a subscription is linked to the amount of power signed up for, power management makes it possible to opt for a subscription for less power than that which would normally be needed. If the price of energy depends on the total power supplied to the installation, power management makes it possible to avoid reaching tariff rates beyond which energy becomes more expensive. In addition to its economic benefits, power management is also justified by the extra convenience it provides by eliminating the risk of untimely tripping due to overloading the mains system.

Power management is currently generally achieved by using a special electrical communication and control installation which requires special-purpose wiring and is not particularly upgradeable or by using the indoor mains system directly as a communication medium by using the well-known carrier current technique.

A method of controlling load disconnection/reconnection which uses look-ahead techniques for a home network is known from European patent application EP-A-0372961 filed on behalf of HONEYWELL INC. An electric power distribution system consisting of a control unit designed to monitor the power which the system can deliver and the power demanded by loads for their operation is also known from British patent application GB-A-2071438 filed on behalf of CENTRO RICERCHE FIAT SPA.

All these methods have the drawback of requiring that systematic power measurement be carried out and involve comparison between measured, global or partial power and a power setpoint. In addition, the management units of systems disclosed in the above mentioned documents generate load shedding/reconnection commands according to predetermined priority criteria without any possibility of compromise or negotiation between managements units and disconnectable appliances. In addition, power management systems according to the prior art use additional switches outside the controlled appliances and require special-purpose wiring.

SUMMARY OF THE INVENTION

The purpose of the present invention is to overcome these drawbacks by proposing a method of managing electric power in a home network to which appliances and a power manage capable of 2-way communication with each other are connected, each appliance consisting of at least one power subassembly and one control subassembly, the power manager being designed to manage load shedding and reconnection functions which exclusively affect the said power subassemblies of each other appliance with each disconnectable appliance being initially disconnected. Power assemblies may include conventional power switching means, as is well known in the art.

According to the invention, any request for significant electric power by an appliance which was previously disconnected results in a transaction, or communication between the appliance and the power manager during which the requesting disconnected appliance supplies the said power manager with information of a quantitative and qualitative nature concerning the power requested by the requesting appliance and on completion of which the power manager authorises or does not authorise reconnection of the power subassembly of the requesting appliance.

Using the process according to the invention, any reconnection operation is the subject of a request by the requesting appliance which is handled by the power manager, and is the subject of negotiation between them on the basis of information directly supplied by the requesting appliance without any need to systematically perform instantaneous measurement of the power actually consumed. In addition, because each appliance is disconnected a priori, it is possible to execute commands in masked time.

According to one useful version of the method according to the invention, the power manager continuously has an estimate of the electric power actually committed in the network on the basis of information supplied during reconnection transactions by requesting appliances or subassemblies of requesting appliances and also has information on the total cumulative power not to be exceeded, the estimate and the said information being processed in order to generate an estimate of the power that is actually still available in the network.

Estimating the electric power commitment allows the power manager to take decisions to authorise reconnection with complete safety because it has a safety margin which makes it possible to avoid any risk of reaching the tripping threshold.

According to another useful feature of the method according to the invention, any disconnectable appliance that was previously authorised to be reconnected, informs the power manager of any significant reduction in the power actually used by its power subassembly, any significant increase in power by a previously reconnected appliance also being subject to an increase request submitted to the power manager and only becoming effective after it has been authorised by the said power manager.

According to another aspect of the invention, the system for globally managing electric power in a home network to which appliances capable of 2-way communication with each other are connected including a so-called power manager unit and so-called disconnectable appliances with each appliance consisting of a control subassembly containing means of control and processing, in particular a microcontroller, non-volatile, rewriteable memory, means of bidirectional transmission suitable for the network and each disconnectable appliance also consisting of at least one disconnectable and reconnectable power subassembly, with this system using the method according to the invention and characterised in that the respective control subassemblies of each disconnectable appliance are designed to carry out a transaction, on the occasion of each request for power made by the said disconnectable appliance, with the power manager and are capable of supplying the latter, via the means of bidirectional transmission and the network, with information of a quantitative and qualitative nature representing the power requirements requested by the disconnectable appliance with a view to obtaining authorization for reconnection.

BRIEF DESCRIPTION OF THE DRAWINGS

Other features and advantages of the invention will be apparent from the following description, reference being made to the appended drawings by way of non-exhaustive examples.

DESCRIPTION OF THE PREFERRED EMBODIMENTS

There follows a detailed description of the power management method according to the invention and of a system for its implementation, reference being made to FIGS. 1 to 7.

Figure 1:
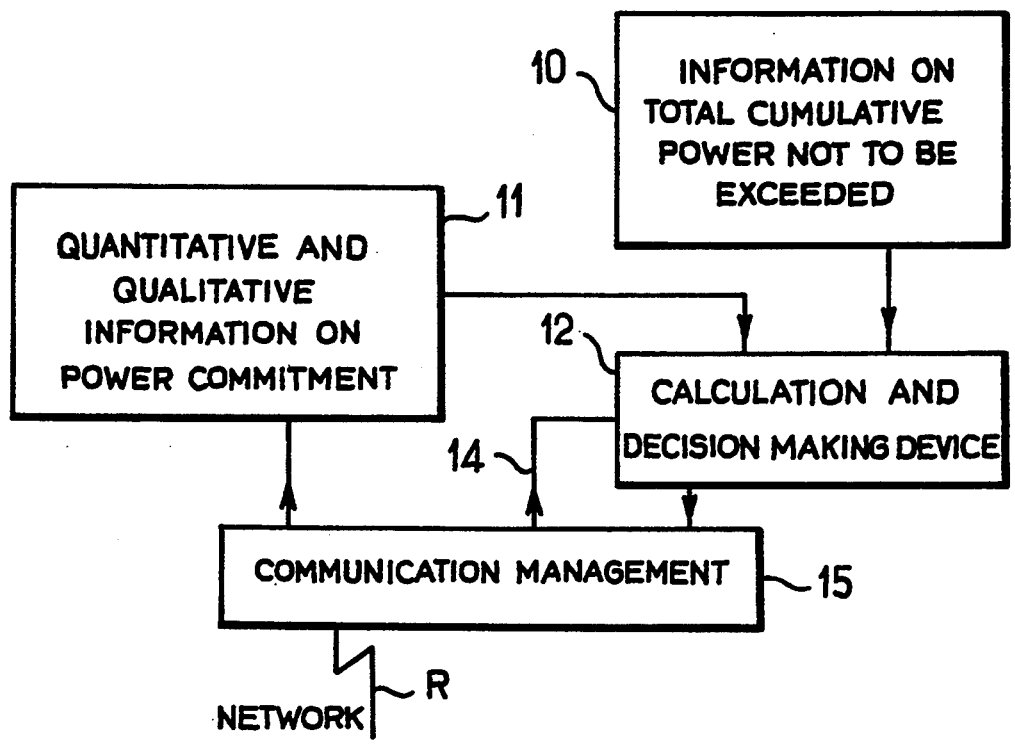
FIG. 1 shows the block diagram of the basic functional subassemblies of a power manager used in the method according to the invention.

A power manager implemented in this invention must have the following functionalities, reference being made to FIG. 1:

Management of communications 15 with a network R, e.g. a mains system, to which it is connected,
Reception 11 of quantitative and qualitative information on power commitments made by various reconnected appliances,
Retention 10 of information on the total cumulative power which must not be exceeded in the network,
Calculation and decision-making functions 12 concerning load shedding/reconnection operations.

Figure 2:
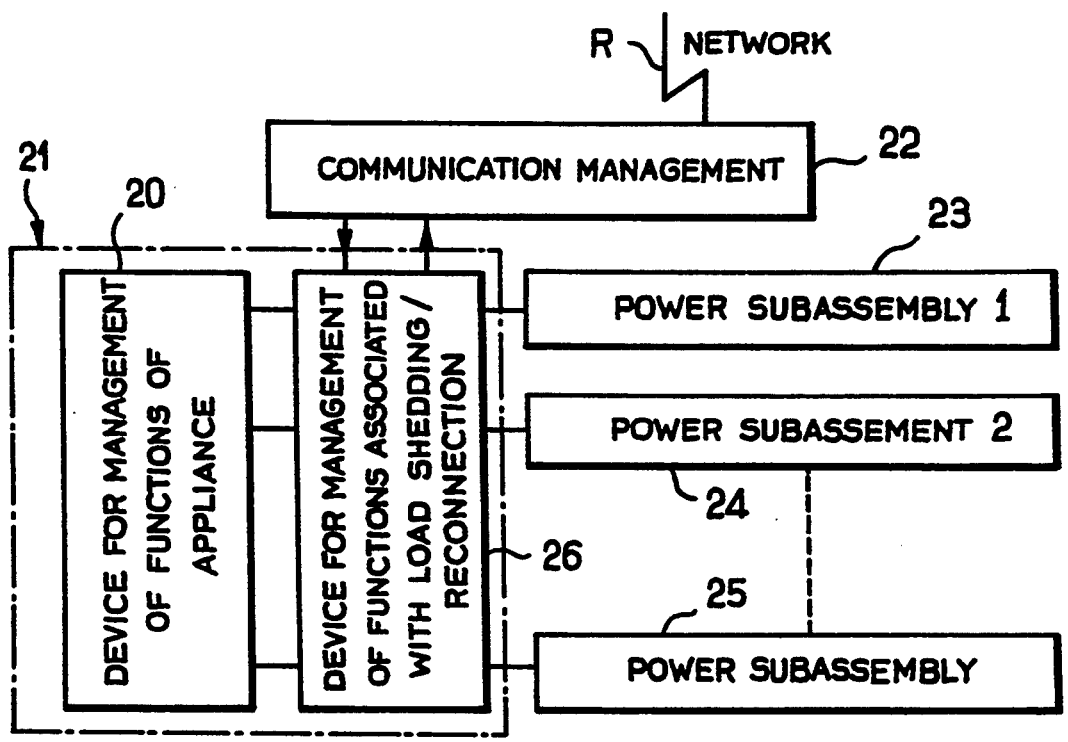
FIG. 2 shows the block diagram of the basic functional subassemblies of a disconnectable appliance capable of using the method according to the invention.

Each disconnectable appliance connected to home network R consists of, reference being made to FIG. 2, a control subassembly 21, at least one power subassembly 23, 24, 25 and a communication management unit 22 in network R. Each power subassembly 21 generally consists of a first management device 20 for the special-purpose functions of the said appliance and a second management device 26 for special-purpose power management functions connected to each of the power subassemblies 23, 24, 25 and to the communications management unit 22.

Figure 3:
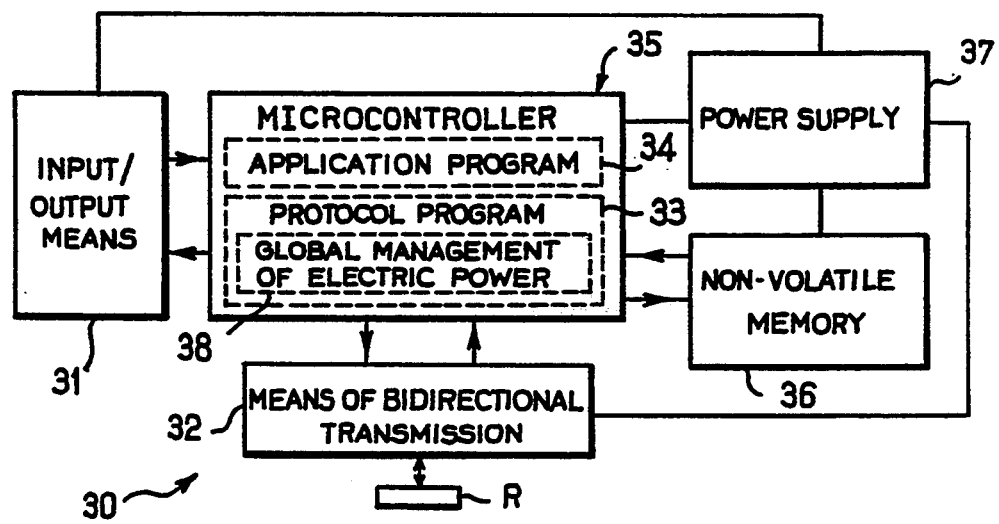
FIG. 3 shows block diagram of the control subassembly of a disconnectable appliance capable of using the method according to the invention.

The power manager consists of, reference being made to FIG. 3, a control module 30 including a bidirectional transmission interface 32, means of input/output 31 generally consisting of a keypad and displays, an electric power supply unit 37, non-volatile, preferably rewriteable, memory 36, e.g. backed up RAM, EEPROM or a FLASH memory and a processing and control unit 35 preferably implemented as a microcontroller or as any other equivalent means which cooperates with all the other components of control module 30. The processing and control unit 35 generally contains, in read-only memory, software consisting of an application program 34, a communication protocol management program 33 and a power management program 38.

Figure 4:
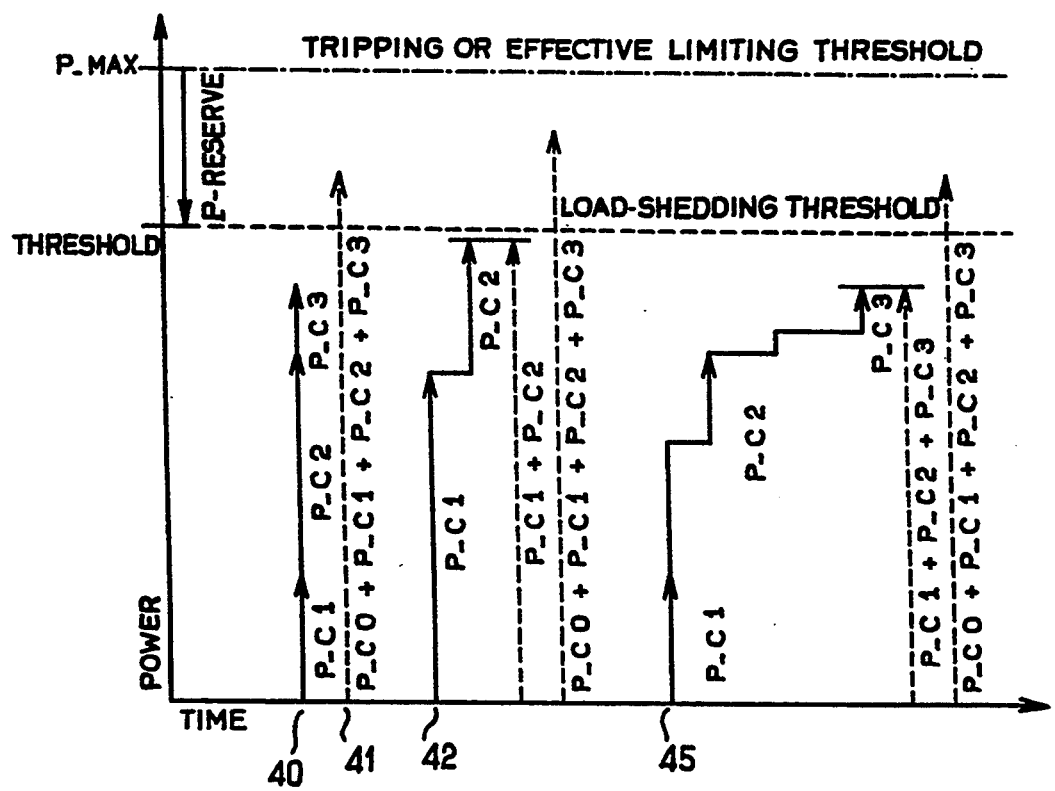
FIG. 4 describes the manner in which the various powers change over time in an example of the application of the method according to the invention.
Figure 5:
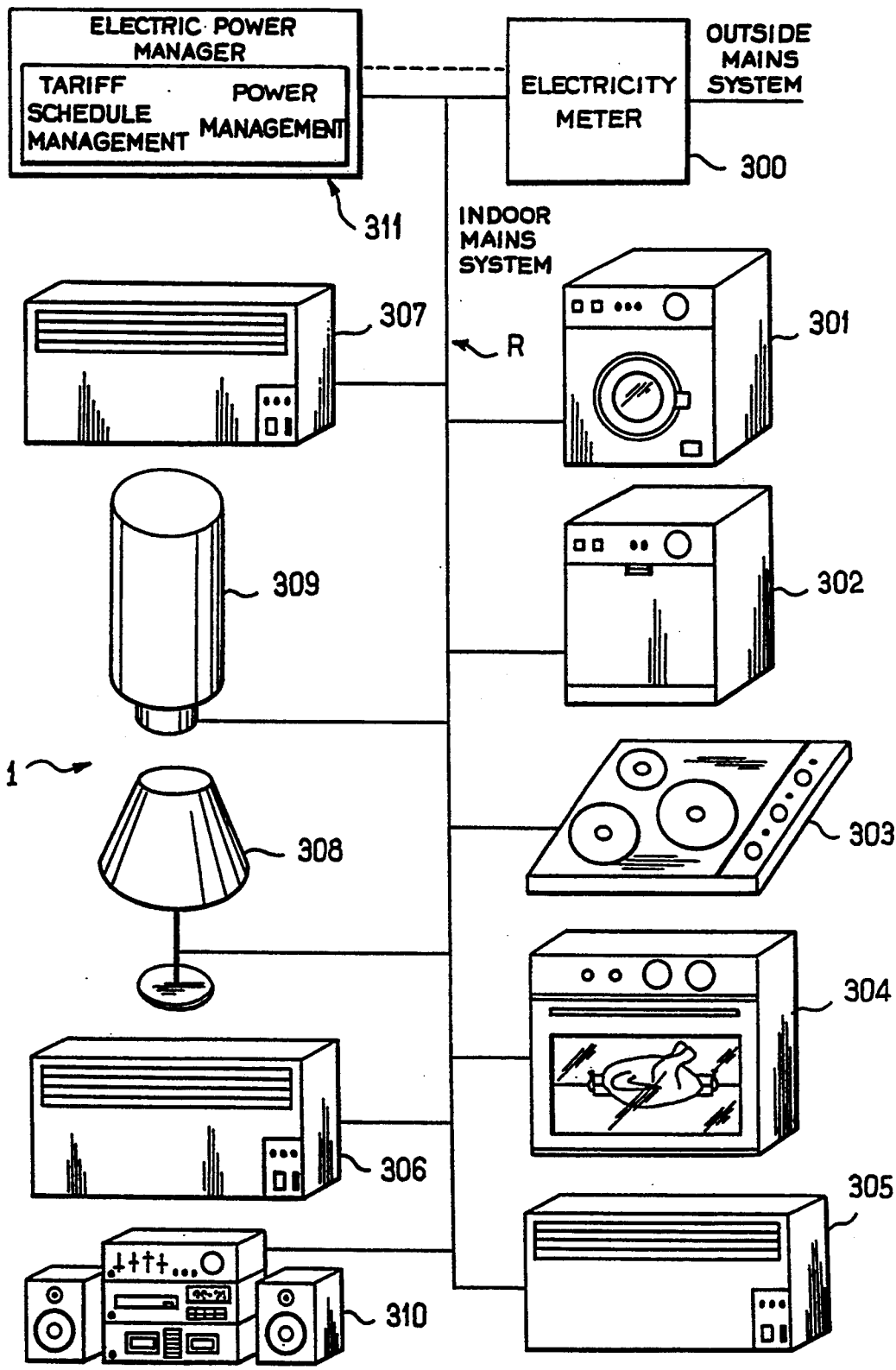
FIG. 5 illustrates an example of a home network which may involve use of the method according to the invention.

A practical example of power management in a home network R including a number of disconnectable appliances 301–307 of which the power can be managed according to the invention, reference being made to FIG. 5, is illustrated in the form of a graph in FIG. 4. Disconnectable appliances 301–307 connected to network R are categorized in three power commitment classes PC1, PC2 and PC3 whereas those appliances of which the power is not managed by the method according to the invention 308–310 are assigned to class 0.

Class 0 includes those appliances which are not affected by the method according to the invention. This class includes appliances that do not communicate, appliances that communicate but in a way which is not compatible with the power manager or appliances that communicate in a way which is compatible with the power manager but of which the power consumption does not justify their management by the method according to the invention, e.g. certain small domestic appliances, low-power lighting fittings and audio and video equipment.

Class 1 includes appliances of which the power is managed using the method according to the invention and which require the presence of the user during periods when electric power is consumed. This class contains appliances for which power supply takes priority, e.g. appliances for preparing food and cooking.

Class 2 includes appliances of which the power is monitored using the method according to the invention and which operate on an independent, intermittent basis, e.g. washing machines, tumble driers and dishwashers. These appliances generally have a low temperature lag or cannot tolerate interruptions in the power supply to their power subassemblies during their operating cycle.

Class 3 includes appliances capable of being managed according to the invention and which have an operating cycle that can be interrupted without any problem. These appliances can be disconnected at the request of class 2 and 1 appliances.

In the example illustrated in FIG. 5, the appliances shown are divided into classes as follows:
Class 0: an audio system 310 and lamps 308, 309,
Class 1: an oven 304 and a hot plate 303,
Class 2: a washing machine 301 and a dishwasher 302,
Class 3: a water heater 309 and electric convector heaters 305, 306, 307.

Home network R is linked to the outdoor mains system via electricity meter unit 300 and consists of a power manager unit 311 which integrates power management and tariff schedule management functions. A European patent application filed at the same time as this application on behalf of the same Assignee describes a method of managing tariff schedules that can be applied to a home network in conjunction with the power management method according to the invention.

Figure 6:
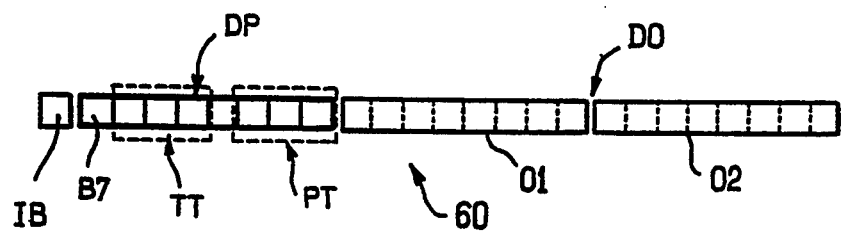
FIG. 6 shows the format of a message sent by the manager.

This tariff schedule management method uses the sending of tariff information messages 60 by power manager 311, reference being made to FIG. 6 which illustrates an example of the format of such messages.

Tariff information message 60 consists of:
Binary information IB,
A main tariff event descriptor byte DP,
Optional predictive type information DO.

Binary information IB indicates whether the tariff event can be classified in the "normal tariff" or "economical tariff" category.

Main descriptor DP is coded in one byte of which, for instance, bits 0 to 2 indicate a tariff rate PT, bits 4 to 6 indicate a type of tariff TT and bit B7 indicates if prior notification of a change (bit 7=0) or an actual tariff change (bit 7=1) is involved and bit 3 is binary information.

The optional predictive information is based on the observation of various tariff changes over a 24-hour period preceding the sending of each tariff information message. Only actual tariff status changes are taken into account, not prior notifications. Optional information DO consists of one or two blocks of 2 bytes each 01, 02 depending whether the number of tariff status changes observed during the preceding 24-hour period is 1, 2 or more.

With reference to FIG. 4, it is assumed that power manager 311 initially knows the maximum power Pmax signed up for with the electric power distributor as well as a reserve power equivalent to the consumption of appliances that cannot be disconnected and which can be modified by the system user. It is assumed that lamp 308 is initially lit, oven 304 is switched on, washing machine 301 and dishwasher 302 are working as is water heater 309 and one convector heater 310. The sum 40 of the powers drawn by all the disconnectable appliances in operation is PCi+PC2+PC3 which is less than the load-shedding THRESHOLD whereas the total sum 41 of the power commitment including those appliances that cannot be disconnected exceeds the threshold but is less than the tripping limit.

If at instant 42 a request is made to switch on hot plate 303, communication is established in accordance with the invention between this appliance and power manager 311. The power requested by the appliance is such that the sum of the disconnectable appliances in classes 1, 2 and 3 exceeds the load-shedding threshold. Given the value of the power for class 2, load shedding in class 3 alone is insufficient to be able to reconnect the requesting appliance 303. The manager then sends a load-shedding command for all appliances in classes 2 and 3 and then authorises reconnection of requesting appliance 303; all the disconnected appliances then attempt to send a reconnection request in a preset sequence which is specific to them. Class 2 always takes priority over class 3. At instant 45, hot plate 303 is switched off, a message is automatically sent by appliance 303 to indicate its change of status and receiving this message initiates a reconnection request procedure for all appliances 302, 309, 307 for which reconnection was denied during the previous session.

If the home network does not include a power manager or if the latter is not in working order, disconnectable appliances are unconditionally set to reconnected mode and switching them on is not restricted in any way apart from the conventional tripping limit.

If the home network does include a power manager, disconnectable appliances are set to disconnected mode by default and any switch-on of the power subassembly of one of these appliances must be authorised by the power manager after negotiation.

The power manager is continuously aware of the total power commitment for each of the classes of disconnectable appliances because, according to the invention, each appliance sends a message to the power manager when its energy status changes and the status messages contain all the characteristic data for the appliance and are examined by the power manager which, in return, performs the following processing:

If an appliance which has just been reconnected is involved, the value of the total power commitment for the class to which the appliance concerned belongs is increased by the power indicated in the received message;

If an appliance which has just been disconnected is involved, the value of the total power commitment for the class to which the appliance belongs is reduced by the indicated power;

If a disconnectable appliance which has just been switched off is involved, the value of the total power commitment for the class to which the appliance belongs is reduced by the power indicated in the message.

In another useful embodiment of the method according to the invention, the power manager has complete freedom, apart from any request sent by an appliance, to disconnect appliances, particularly those in class 3, and to carry out equal time-division management. By way of non-exhaustive example and with reference being made to FIG. 7, consider a heating system consisting of several convector heaters C1–C3 which are disconnected and reconnected in turn without exceeding the total power commitment limit in order to allow, for instance, a washing machine L to perform an uninterrupted cycle without causing any perceptible reduction in the thermal conformity of the dwelling.

Figure 7:
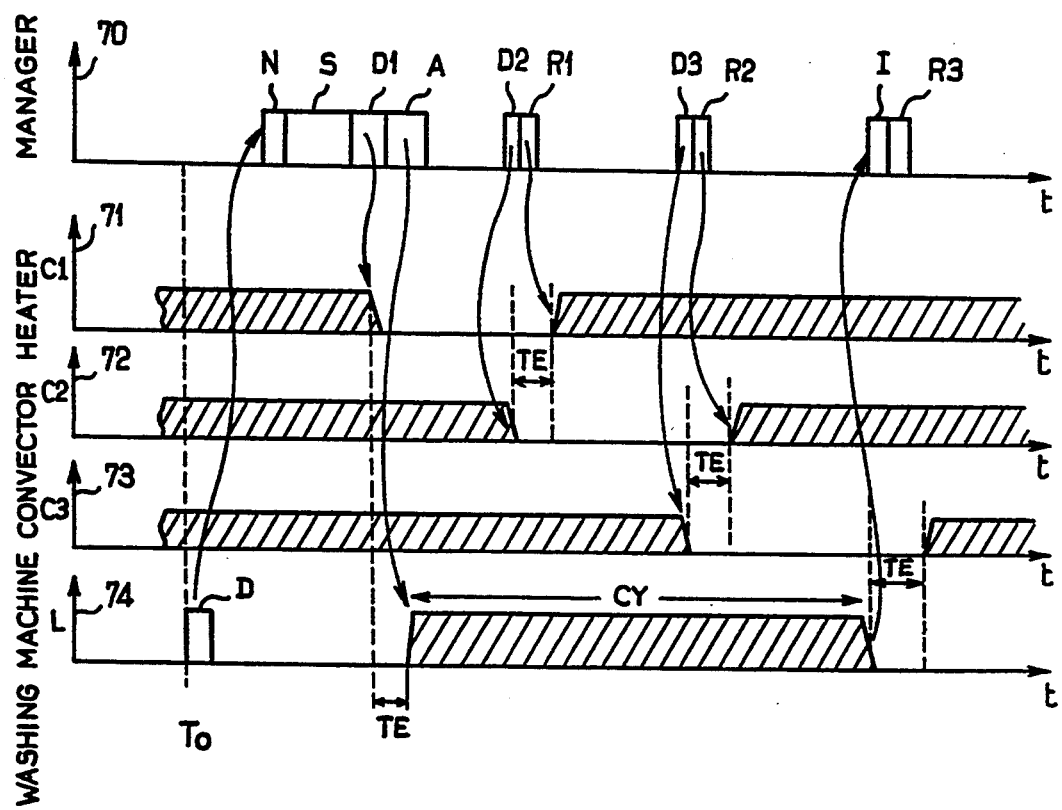
FIG. 7 includes timing diagrams illustrating the essential stages in communication between communicating appliances and the manager in an equal time-division energy distribution mode in a network.

In the example illustrated in FIG. 7, the power manager manages, within a dwelling, the distribution of power intended for three convector heaters C1–C3 and a washing machine L to which timing diagrams 70, 71–73 and 74 correspond respectively and which illustrate the status and operating cycles of each of these appliances. It is assumed at initial instant To that the three convector heaters C1–C3 are switched on and washing machine L which belongs to class 2 sends a switch-on request D to the manager. On reception N of this request, the manager performs a simulation S of the total power level to be committed in order to meet the switch-on request from the washing machine and if this total level exceeds the load-shedding threshold, it disconnects one or more convector heaters in order to allow switch-on of washing machine L. In the example illustrated, load-shedding commands D1, D2, D3 and reconnection commands R1, R2, R3 will successively and periodically be sent to convector heaters C1–C3 in order to obtain uninterrupted washing cycle CY. On completion of washing cycle CY, washing machine L informs the manager that this cycle has terminated by message I. The manager then sends a reconnection command R3 for the last convector heater disconnected C3 and quits equal time-division power management mode. In order to allow completely safe switching without any risk of tripping, a timeout TE can usefully be provided between any reconnection command and its execution, the timeout being determined taking into account the minimum response time of the slowest appliance which has to execute a disconnection request.

Obviously, the invention is not confined to the examples described and many changes can be made to the invention. Thus, the number of disconnectable appliances connected to the home network is only limited by the capacity of the network which may also include other disconnectable appliances. It is also possible to envisage other ways of implementing the means of control and processing incorporated in the control subassemblies. In addition, the power manager may also perform other additional functions separate from specific reconnection/load shedding operations.

I claim:

1. Method of managing electric power in a network within a dwelling to which electrical devices and a power manager capable of two-way communication with each other are connected, said electrical devices comprising disconnectible electrical devices, said power manager being designed to manage load shedding and reconnection functions of said disconnectible electrical devices, said disconnectible electrical devices comprising a control subassembly and at least one power subassembly, wherein each disconnectible electrical device is initially disconnected, any request for significant electrical power by a previously disconnected electrical device resulting in a communication between said initially disconnected power requesting electrical device and said power manager during which said requesting electrical device supplies said power manager with information of a quantitative and qualitative nature concerning the power requested by said requesting electrical device, and on completion of said communication, said power manager decides whether to authorize reconnection of said requesting electrical device.

2. Method according to claim 1, wherein said power manager continuously has an estimate of the electric power actually committed in the network on the basis of informations supplied during reconnection communications by requesting electrical devices, and stores a value of a total cumulative power not to be exceeded, said estimate and said value of said total cumulative power being processed in order to generate an estimate of the power that is actually still available in said network.

3. Method according to claim 1, wherein when any disconnectible electrical device that was previously authorized by said power manager to be reconnected experiences a significant reduction in power necessary to operate, said electrical device informs said power manager of said significant reduction, and when a previously reconnected electrical device experiences a significant increase in its power requirements, an increase request is submitted to said power manager, said increase power requirements only becoming effective after said request has been authorized by said power manager.

4. Method according to claim 1, wherein said disconnectible electrical devices are informed of an existence of said power manager within said network by an occurrence of one of the following: a reception of a message acting as a presence declaration message sent by said power manager when said power manager is put into operation within said network, a reception of said message acting as a presence declaration message at the request of said disconnectible electrical devices when said disconnectible electrical devices are put into operation within said work, when said disconnectible electrical devices have obtained no response to a reconnection request upon expiration of a predetermined delay after sending said request to said power manager, and on completion of a predetermined number of requests by said disconnectible electrical devices.

5. Method according to claim 4, wherein upon an occurrence of one of the following: no response to a power manager presence declaration message request is received by a requesting disconnectible electrical device, when said disconnectible electrical device obtains no response to a reconnection request upon expiration of said predetermined delay, and on completion of a predetermined number of requests, then a non-existence of said power manager within said network is established, and said disconnectible electrical devices are then continuously set to a reconnected state.

6. Method according to claim 4, wherein when a disconnectible electrical device recognizes a presence of said power manager by receiving a message acting as a power manager presence declaration message, said disconnectible electrical device is set to a normal operation operating state which includes, in the event of any power request, a reconnection communication with said power manager.

7. Method according to claim 1, wherein said power manager is able to perform load shedding and reconnection operations on a predetermined subset of said electrical devices connected to said network in order to ensure equal time division management of electrical power within said network.

8. Method according to claim 1, wherein said power manager also performs electric power tariff schedule management during which, with every change of electric power tariff, said power manager sends information about said tariff change to electrical devices connected to said network which are effected by said tariff change.

9. Method according to claim 1, wherein, in response to a request for significant electrical power by a previously disconnected electrical device, when said requested power is such that a sum of powers committed by connected electrical devices would exceed a predetermined load-shedding threshold, said power manager sends a load-shedding command to predetermined subsets of disconnectible electrical devices, before authorizing reconnection of said requesting electrical device.

10. System for globally managing electric power in a home network to which disconnectible electrical devices and a power manager capable of two-way communication with each other are connected, each disconnectible electrical device comprising:
   a control subassembly comprising a microcontroller, nonvolatile, rewritable memory, and means for bidirectional communicating over said network,
   at least one power subassembly,
   said control subassemblies further comprising means for communicating over said network with said power manager upon each significant power request made by said disconnectible electrical device, said disconnected eletrical device being initially disconnected, and means for supplying to said power manager, via said bidirectional communication means over said network, with information of a qualitative and quantitative nature representing a power requirement requested by said disconnectible electrical appliance, to obtain permission from said power manager to reconnect to said home network.

11. System according to claim 10, wherein said power manager comprises means for controlling and processing and means for bidirectional communication over said network, said means for controlling and processing further comprising means for transmitting over said network selective reconnection commands to requesting disconnectible electrical devices on completion of a communication carried out between said disconnectible electrical device and said power manager.

12. System according to claim 1, wherein said means for controlling and processing of said power manager continuously generate an estimate of a power actually committed in said network on a basis of information supplied during each communication of said disconnectible electrical devices with said power manager, and of previous informations relative to an electric power commitment for all non-disconnectible electrical devices which may be connected to said network, said controlling and processing means of said power manager making said estimate in an absence of physical measurement of a power consumed by said electrical devices, subassemblies of said electrical devices, and by said network itself.

* * * * *